United States Patent [19]

Leymonerie

[11] 3,722,069
[45] Mar. 27, 1973

[54] METHOD OF OPENING A CLOSED VACUUM VESSEL IN A VACUUM SPACE

[75] Inventor: Paul Leymonerie, Malmort, France

[73] Assignee: U.S. Philips Corporation, New York, N.Y.

[22] Filed: Apr. 5, 1971

[21] Appl. No.: 131,149

[30] Foreign Application Priority Data

Apr. 3, 1970 France..................................7012088

[52] U.S. Cl........................................29/427, 29/413
[51] Int. Cl.........................B23p 19/02, B23p 17/00
[58] Field of Search.....29/426, 427, 200 D, 413, 411

[56] References Cited

UNITED STATES PATENTS 2,485,926  10/1949  Saucet.....................................29/426
3,589,881  6/1971  Langley et al........................29/426 X Primary Examiner—Thomas H. Eager
Attorney—Frank R. Trifari

[57] ABSTRACT

A method of opening a vacuum vessel in a vacuum space where the vessel is to be opened without producing undesired elements into the vacuum space. The walls of the vessel must comprise two parts that are connected together by means of a closure member having a U-shaped cross-section. The closure member is constructed of two flat rings that are connected at their inner edge. The method step comprises rotating the parts of the wall in opposite directions until the joining of the edges fractures.

5 Claims, 5 Drawing Figures

INVENTOR.
PAUL LEYMONERIE

METHOD OF OPENING A CLOSED VACUUM VESSEL IN A VACUUM SPACE

The invention relates to a method of opening a vacuum vessel in a vacuum space.

This is necessary, for example, in manufacturing photocathodes which are coated with an active layer in a vacuum vessel by vapor deposition. The cathodes have to be transferred in vacuo to the tube for which they are destined.

The problem is to avoid chips, dust or other waste products in the vacuum space that are formed as a result of the separation of the parts of the vacuum vessel when the vessel is opened. Therefore, the melting of a connection by means of a more easily melting type of glass or of soldering material for example, is not desirable, since drops of glass or solder may enter the vacuum space and the pump duct. Nor is it possible to open a metal seam by turning.

It is known, for example, from the U.S. Pat. Specification No. 2,969,163 relating to an envelope of a cathode-ray tube, to interconnect the window and the cone by means of two flat rings, the edges of which are situated outside the tube and are interconnected so that the rings together constitute a body having a U-shaped cross-section. In order to open the envelope, the connection edge of the rings, i.e., the bottom of the U, may be turned down and the parts may be connected together again afterwards by providing soldering material between the edges of the disks. This method is not possible in a vacuum space since upon turning down, chips are formed which may enter the duct of the vacuum pump.

In the tube construction described in French Pat. Specification No. 844,064, annular members having U-shaped sections are used as contact members. In this case, the rings were interconnected with the edges situated inside the tube. Due to the flexibility of the rings the differences in coefficients of expansion of the various materials were minimized. Openings of the tube remained out of consideration.

Opening a vacuum vessel in a vacuum space can be more advantageously accomplished by means of the method according to the present invention in which the two wall parts of the vacuum vessel, composed in known manner of two parts which are connected together to make a vacuum seal by means of two flat rings, the edges of which are located inside the vessel, and are formed so that the rings form a member having a substantially U-shaped section which are capable of being rotated relative to each other in opposite directions until, as a result of the twisting of the joint of the edges of the rings, the connection between the rings is interrupted. This interruption occurs without the formation of loose particles.

Since the inner edges of the rings are interconnected, the force required for rotating the wall parts of the vacuum vessel can be less than the outer edges having a larger diameter. The connection between the metal edges of the rings may comprise a part having a smaller wall thickness if the rings are manufactured from one piece. Or the connection between the metal edges may consist of a soldered seam.

In order that the invention may be readily carried into effect, a few embodiments thereof will now be described in greater detail, by way of example, with reference to the accompanying drawing, in which.

Figure 1:
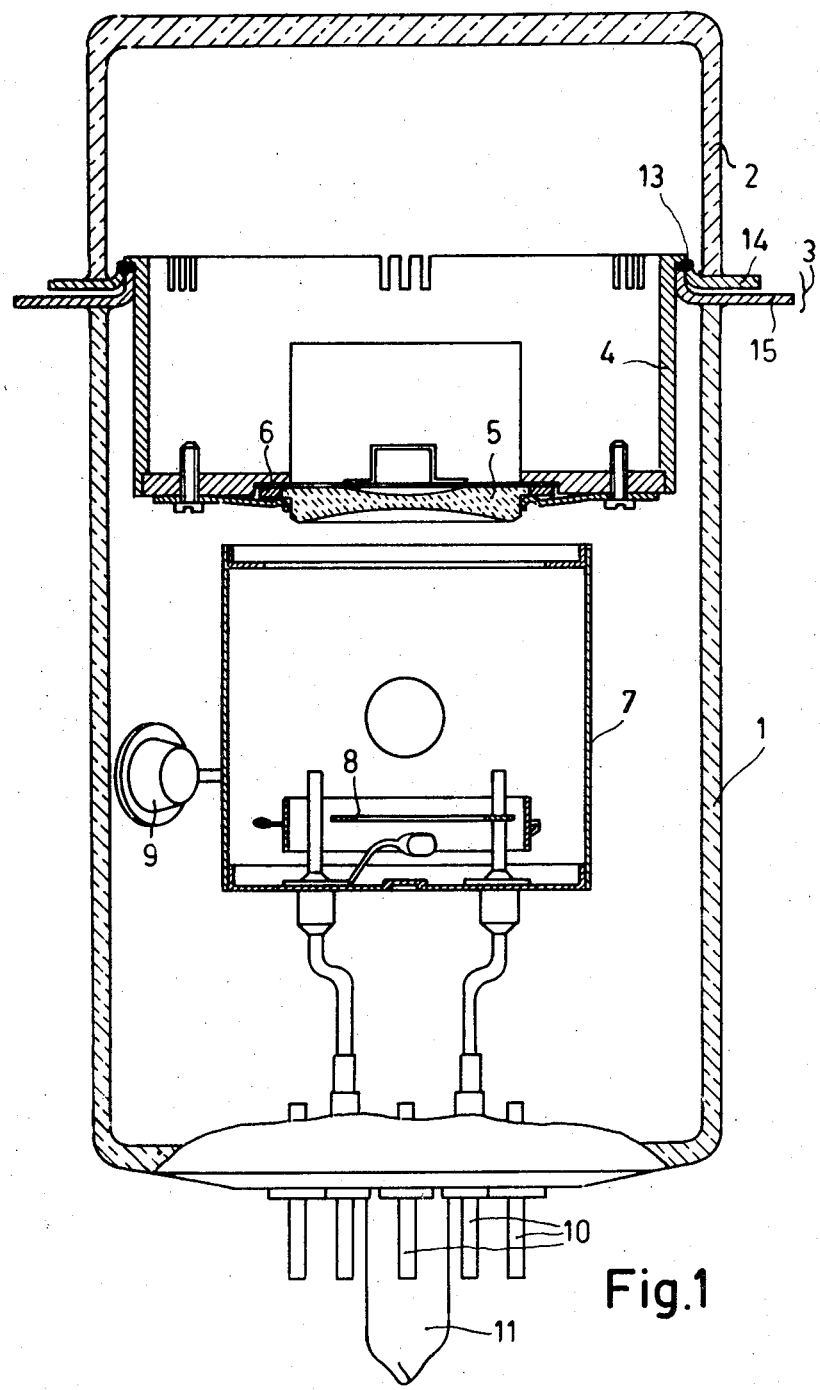
FIG. 1 shows a vacuum vessel in which a photocathode can be covered in vacuo with a vapor deposited active layer.

Reference numeral 1 in FIG. 1 denotes a wall part of a vacuum vessel which is connected so as to be detachable to the wall part 2 by means of an annular sealing member 3 having a substantially U shaped section. This member 3 consists of two flat rings 14, 15 which are interconnected by means of a soldered seam 13. On the ring 15 bears a holder 4, in which a glass disk 5, in this case constructed as a concave lens, is provided so as to be rotatable by means of a sliding ring 6. The lower surface of the glass disk 5 is covered with a thin metal layer by evaporation from a filament 8, which is arranged in a cylinder at some distance from the surface of the member 5. The filament 8 is connected to the current supply pins 10. The wall part 1 of the vacuum vessel comprises an exhaust tube 11 which is sealed after evacuation of the vessel 1, 2. A getter holder 9 is furthermore provided in the vacuum vessel 1, 2.

The upper side of the wall part 2 is flat and serves to check the thickness of the metal layer being deposited on the member 5. When this layer has reached the desired thickness, the vessel 1, 2 is transferred to a vacuum space in which grippers are arranged to clamp the wall parts 1 and 2 and to rotate them in opposite directions relative to each other. The soldered seam 13 will tear loose without loose particles being formed. The photocathode 5 and, if desirable, also the holder 4, may then be placed in the discharge tube for which it is destined after which the discharge tube is sealed in the vacuum space so that the photocathode surface of the member 5 is not contacted by air.

The sealing member 3 having a U-shaped section may be shaped in different ways.

Figure 2:
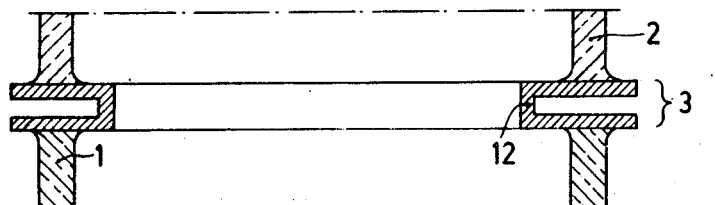
FIGS. 2, 3, 4 and 5 show several suitable embodiments of the U shaped member for use of the method according to the invention for opening the vacuum vessel in a vacuum space.

In FIG. 2, a thick metal ring is turned down deep so that a thin wall part 12 remains which connects the flat rings which are formed by said turning down.

Figure 3:
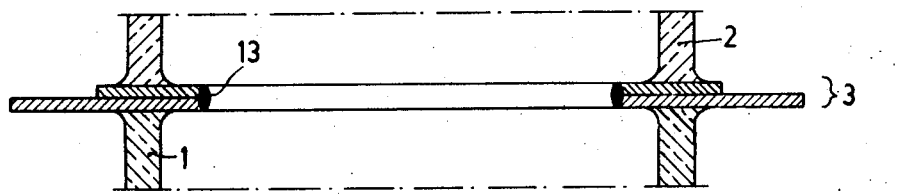

In FIG. 3 the flat rings of the sealing member 3 have different outside diameters and the inner edges are interconnected by means of a soldered seam 13.

Figure 4:
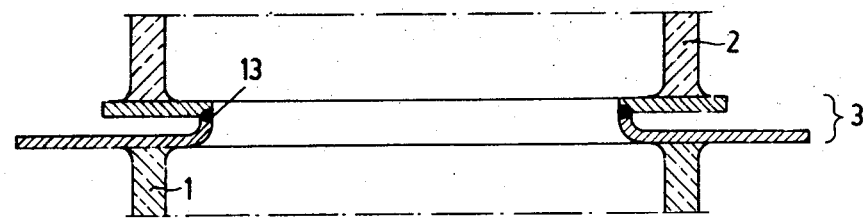

In FIG. 4, one ring has an upright edge on its innerside on which the other flat ring is secured by means of a soldered seam 13.

Figure 5:
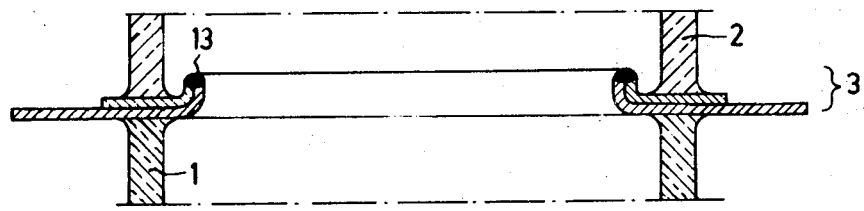

In FIG. 5 both rings are provided on the innerside with upright edges which are bent in the same direction and fit one in the other and are connected to the upper side by a soldered seam 13. Enlarging the outside diameter of one of the rings may be of importance to obtain a better grip for the gripping device in the vacuum space.

What is claimed is:

1. A method of opening a vacuum vessel in a vacuum space, characterized in that in a vacuum vessel composed in known manner of two parts which are vacuum-tightly interconnected by means of two flat rings the edges of which being located inside the vessel and being interconnected so that the rings form a member having a substantially U shaped section, the two wall parts of the vacuum vessel are rotated in opposite directions relative to each other until, as a result of the twisting of the joint of the edges of the ring the connection between the rings is interrupted.

2. A method as claimed in claim 1 characterized in that the inner edges of the flat rings are interconnected by means of a soldered seam.

3. A method as claimed in claim 2, characterized in that one of the flat rings has a larger outside diameter than the other ring.

4. A method as claimed in claim 2, characterized in that one of the rings has an upright inner edge on which the inner edge of the other ring is secured.

5. A method as claimed in claim 2, characterized in that both rings comprise upright inner edges which fit one in the other and are bent in the same direction.

* * * * *